Nov. 16, 1971         I. W. COUCH         3,619,933
TROT LINE KEEPER
Filed Feb. 11, 1969                      2 Sheets-Sheet 1
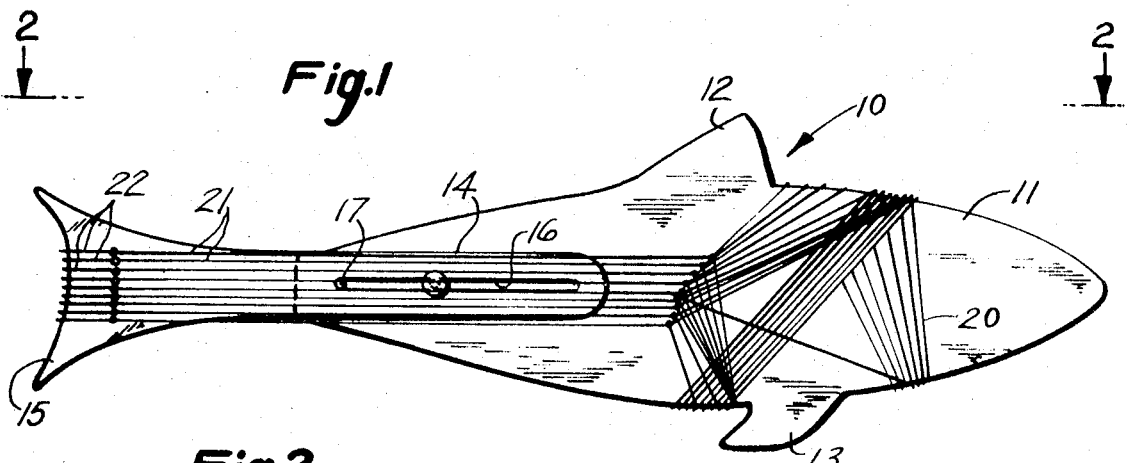
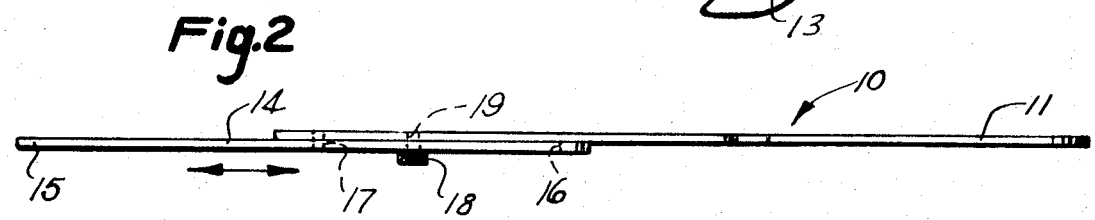
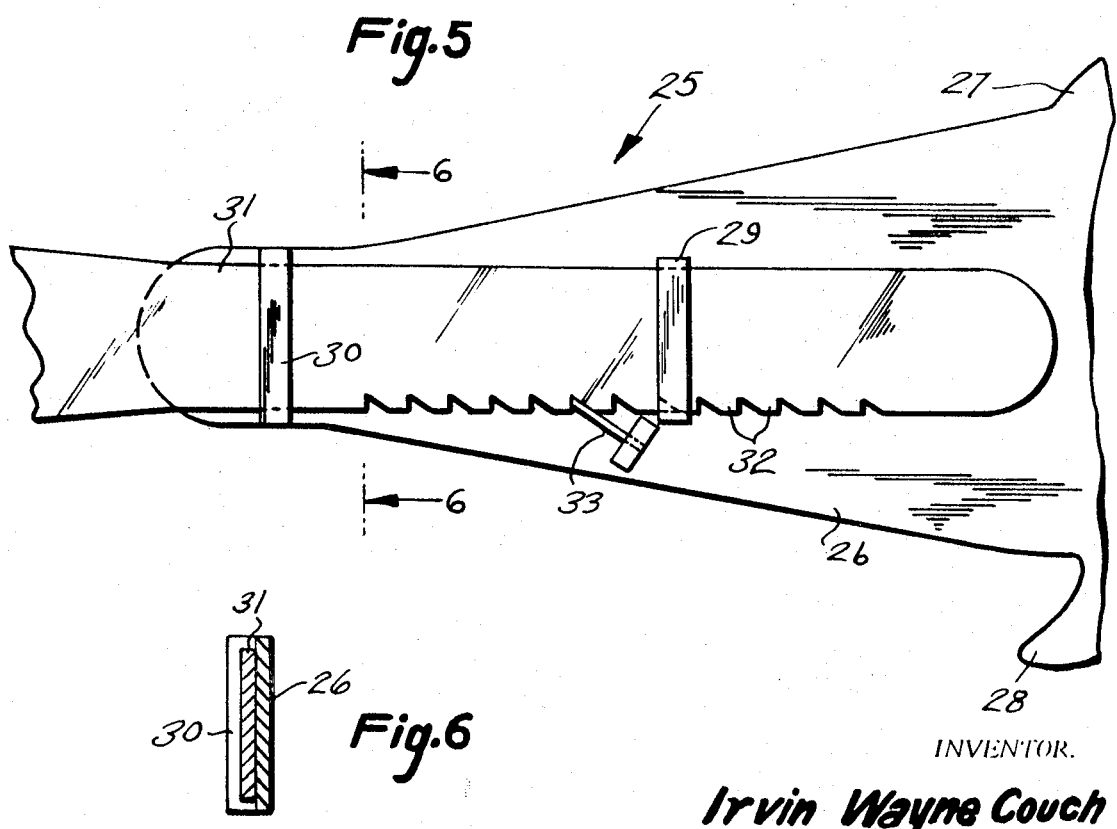
INVENTOR.
*Irvin Wayne Couch*

Nov. 16, 1971  I. W. COUCH  3,619,933
TROT LINE KEEPER

Filed Feb. 11, 1969  2 Sheets-Sheet 2

INVENTOR.
*Irvin Wayne Couch*

3,619,933
TROT LINE KEEPER
Irvin Wayne Couch, 2200 Mission Hill Circle, Apt. 101,
Austin, Tex. 78741
Filed Feb. 11, 1969, Ser. No. 798,384
Int. Cl. A01k 97/00
U.S. Cl. 43—54.5 A                          2 Claims

ABSTRACT OF THE DISCLOSURE

An elongated, flat trot line keeper in the shape of a fish for a trot line having a plurality of fish hooks thereon. The keeper comprises a pair of body members slidable relative to each other with means to clamp the members together at any selected position. The trot line is wrapped about the body of the keeper and the fish hooks are received by a transverse end edge of the keeper.

---

This invention relates to fishing tackle, and more particularly to a keeper for trot lines.

It is therefore the main purpose of this invention to provide a trot line keeper which will handle a few hundred feet of line and a plurality of hooks without danger of entangling the hooks or the line.

Another object of this invention is to provide a trot line keeper which may be stored easily without danger of a person being injured by the sharp hooks.

A further object of this invention is to provide a keeper of the described type which will be adjustable to accommodate the length of most leaders and the device allows the trot line to be wound up in a minimum amount of time with a minimum amount of effort.

Other objects of this invention are to provide a trot line keeper which is simple in design, inexpensive to manufacture, rugged in construction, easy to use and efficient in operation.

These and other objects will be readily evident upon a study of the following specification together with the accompanying drawings wherein:

FIG. 1 is a plan view of the present invention showing the line and the hooks in place;

FIG. 2 is a view taken along the line 2—2 of FIG. 1, showing the line and hook removed therefrom;

FIG. 5 is an enlarged fragmentary plan view showing a modified construction of the invention; and FIG. 6 is a cross-sectional view taken along the line 6—6 of FIG. 5.

Figure 3:
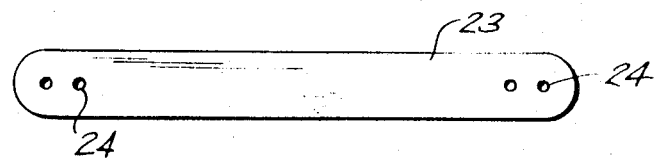
FIG. 3 is a plan view showing an extension that may be used to lengthen the device shown in FIG. 1.
Figure 4:
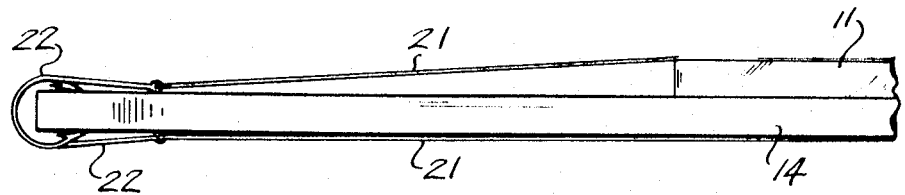
FIG. 4 is an enlarged fragmentary side view of FIG. 1 showing the method of placement of the fish hooks upon the device.

According to this invention, a trot line keeper 10 is shown to include an elongated flat fish-shaped main body 11 having a dorsal-type fin 12 and a lower or pectoral fin 13. A flat bar 14 having a tail fin-shaped portion 15 may be slideable against one side of main body 11 for a purpose which hereinafter will be described. Bar 14 is provided with an elongated slot 16 which slideably carries a guide pin 17, which projects from and is fixedly secured to the main body 11. Slot 16 also carries a knurled set screw 18 which provides adjustment means for the length of trot line keeper 10. Set screw 18 is threadingly received within threaded opening 19 of main body 11 and pin 17 aids in keeping bar 14 in proper alignment with main body 11.

The several hundred feet of trot line 20 are wrapped about main body 11 in such a manner the leaders 21 attached thereto will extend rearward toward the tail fin portion 15 of keeper 10. The fish hooks 22 attached to leaders 21 engage the arcuate edge of trot line keeper 10 from either side of keeper 10 and thus prevent the entanglement of line 20 and its respective leaders 21 and fish hooks 22.

Looking now at FIG. 3 of the drawings, one will see a flat elongated extension bar 23 having spaced apart openings 24 near each end. Extension bar 23 may be secured between main body 11 and flat bar 14 if longer staging is desired by the user, the openings 24 providing a means for receiving suitable fasteners to secure extension bar 23 to keeper 10.

Looking now at FIG. 5 of the drawings, one will see a modified form of trot line keeper 25 having a similar shaped body 26, as was heretofore described in the main embodiment of the present invention. Main body 26 is provided with a fin 27 and a fin 28, and a pair of U-shaped configurated guide members 29 and 30. These guide members are fixedly secured and spaced apart on one side of the main body 26 and slideably receive a flat bar 31 (the tail portion of which is not shown). One edge of bar 31 is provided with a plurality of teeth 32 which are of such construction as to engage with a detent spring 33 which is secured at one end to the main body 26. The detent spring 33 and its associated teeth 32 of bar 31 serves as a retaining means for any desired length of keeper 25 which is accomplished in a well known manner.

What I now claim is:

1. A trot line holder comprising an elongated main body portion, an edge at one end of said body and substantially transverse to the length of said body, an extending portion on said body spaced longitudinally away from the other end of said body, means on said body to vary the longitudinal distance between said edge and said extending portion, said body comprising first and second pieces which are relatively slidable in a longitudinal direction and with said edge on said first piece and said extending portion on said second piece, clamping means for preventing relative longitudinal sliding of said first and second pieces, said clamping means comprising said first piece having a tongue extending longitudinally from the end opposite said edge and socket means on said second piece of a size to allow the insertion of said tongue for longitudinal sliding engagement, ratchet teeth means on said tongue and pawl means on said second piece in releasable engagement with said ratchet teeth means for preventing relative longitudinal movement of said first and second pieces in a direction to decrease the distance between said edge and said extending portion and for allowing relatively unrestricted longitudinal movement of said first and second pieces in a direction to increase the distance between said edge and said extending portion.

2. A holder in combination with a trot line of the type having a length of main cord with a plurality of spaced hooks attached thereto, comprising an elongated main body portion, the main cord being wrapped about the longitudinal axis of said elongated body portion, an edge extending transversely across one end of said body, the plurality of spaced hooks on said trot line being received by said edge, an extending portion on said body spaced away from said other end of said body to prevent the cord wrapped around said body from sliding longitudinally along said body in a direction toward said hook receiving edge, said body portion having means to vary the longitudinal distance between said hook receiving edge and said extending portion so that the hooks can be tensioned on said edge by moving said extending portion longitudinally away from said edge, said body portion being formed from first and second pieces which are relatively slidable in a longitudinal direction and with said edge on said first piece and said extending portion on said second piece, clamping means provided for preventing elongated longitudinal sliding of said first and second pieces, said clamping means comprising said first piece having a tongue extending longitudinally from the end opposite said edge and socket means on said second piece of a size to allow the insertion of said tongue for longitudinally sliding engagement, ratchet teeth means on said tongue and pawl means on said second piece in releasable engagement with said ratchet teeth means for preventing relative longitudinal movement of said first and second pieces in a direction to decrease the distance between said edge and said extending portion and for allowing relatively unrestrictive longitudinal movement of said first and second pieces in a direction to increase the distance between said edge and said extending portions.

References Cited

UNITED STATES PATENTS

| | | | |
|---|---|---|---|
| 1,397,790 | 11/1921 | Tegner | 43—27.4 |
| 2,053,954 | 9/1936 | Marsh | 43—42.5 |
| 2,054,407 | 9/1936 | Campbell | 43—27.4 |

FOREIGN PATENTS

| | | |
|---|---|---|
| 66,794 | 1/1940 | Czechoslovakia. |

ALDRICH F. MEDBERY, Primary Examiner

D. J. LEACH, Assistant Examiner

U.S. Cl. X.R.

43—57.5 A